(12) United States Patent
Kuehne et al.

(10) Patent No.: US 11,738,721 B2
(45) Date of Patent: Aug. 29, 2023

(54) DEVICE AND METHOD FOR MAINTAINING THE CAPABILITY FOR PRECISE NAVIGATION OF AN AUTOMATED GUIDED VEHICLE

(71) Applicant: GRENZEBACH MASCHINENBAU GMBH, Asbach-Bäumenheim (DE)

(72) Inventors: Andreas Kuehne, Harburg Ebermergen (DE); Ruediger Geiger, Genderkingen (DE); Erwin Herre, Buchdorf (DE); Stefan Wilfling, Dillingen (DE)

(73) Assignee: GRENZEBACH MASCHINENBAU GMBH, Asbach-Bäumenheim (DE)

( * ) Notice: Subject to any disclaimer, the term of this patent is extended or adjusted under 35 U.S.C. 154(b) by 763 days.

(21) Appl. No.: 16/636,681

(22) PCT Filed: Aug. 2, 2018

(86) PCT No.: PCT/DE2018/000229
§ 371 (c)(1),
(2) Date: Feb. 5, 2020

(87) PCT Pub. No.: WO2019/029758
PCT Pub. Date: Feb. 14, 2019

(65) Prior Publication Data
US 2021/0146889 A1  May 20, 2021

(30) Foreign Application Priority Data
Aug. 9, 2017  (DE) .................. 10 2017 007 511.5

(51) Int. Cl.
*B60S 3/04* (2006.01)
*H04W 4/029* (2018.01)
(Continued)

(52) U.S. Cl.
CPC .............. *B60S 3/04* (2013.01); *B60L 53/35* (2019.02); *B60W 60/001* (2020.02);
(Continued)

(58) Field of Classification Search
CPC .......... B60S 3/04; H04W 4/029; B60L 53/35; B60W 60/001; G01C 21/3605; G01C 21/3469; G02B 27/0006; G05D 2201/0216
See application file for complete search history.

(56) References Cited

U.S. PATENT DOCUMENTS 3,658,590 A * 4/1972 Huebner ................... B60S 3/04
  134/32
6,272,406 B2  8/2001 Alofs et al.
9,606,541 B2 * 3/2017 Abramson ............ A47L 9/2873

FOREIGN PATENT DOCUMENTS

| CN | 203433365 | 4/2014 |
|---|---|---|
| DE | 202013011145 | 1/2014 |

(Continued)

*Primary Examiner* — Michael E Barr
*Assistant Examiner* — Samuel Robert Barker
(74) *Attorney, Agent, or Firm* — Duane Morris LLP; Gregory M. Lefkowitz; Joaquin Hernandez (57) ABSTRACT

The invention relates to a device and method for maintaining the capability for precise navigation of an automated guided vehicle (TFS), comprising the following method features: a) an automated guided vehicle (1) is automatically sent into a testing station (26) for checking and cleaning of its laser scanner; b) the vehicle (1) is moved within the testing station (26) by means of its drive and the position of the vehicle is checked; c) if the positioning is correct, the laser scanner (2) of the vehicle (1) is cleaned; d) the result of the cleaning process is checked; e) and the vehicle (1) drives out of the testing station (26).

12 Claims, 6 Drawing Sheets

(51) Int. Cl.
*B60L 53/35* (2019.01)
*B60W 60/00* (2020.01)
*G01C 21/34* (2006.01)
*G01C 21/36* (2006.01)

(52) U.S. Cl.
CPC ..... *G01C 21/3469* (2013.01); *G01C 21/3605* (2013.01); *H04W 4/029* (2018.02)

(56) References Cited

FOREIGN PATENT DOCUMENTS

| | | | | |
|---|---|---|---|---|
| DE | 202017004170 | | 10/2017 | |
| EP | 1355128 | | 10/2003 | |
| EP | 1355128 | A1 * | 10/2003 | ........... G01B 11/272 |

* cited by examiner

DEVICE AND METHOD FOR MAINTAINING THE CAPABILITY FOR PRECISE NAVIGATION OF AN AUTOMATED GUIDED VEHICLE

CROSS-REFERENCE TO RELATED APPLICATIONS

This application is a § 371 national stage entry of International Application No. PCT/DE2018/000229, filed on Aug. 2, 2018, which claims priority to German Patent Application No. 10 2017 007 511.5, filed on Aug. 9, 2017, the entire contents of which are incorporated herein by reference.

The invention relates to an apparatus and to a method for maintaining the precision of the navigation capability of a driverless transport vehicle. Driverless transport systems are a means of choice in modern manufacturing plants for controlling the flow of material in a data-optimized fashion.

With respect to the prior art, document DE 699 01 363 T2 discloses a control system for an automatically guided vehicle (AGV), which is based on the aim of providing a guidance system for automatically guided vehicles that is improved over the known prior art. In addition, an AGV guidance system is to be provided that utilizes a first guidance mechanism for guiding the AGV along high-speed portions of the path and a second guidance mechanism for guiding the AGV along low-speed portions of the path.

In this document, a guidance system for guiding an AGV, having the following features, is claimed:

a plurality of non-neighboring rail segments; a steering mechanism for guiding the AGV along the rail segments, and an electric control unit for guiding the AGV between the rail segments, wherein the electronic control unit of the AGV steers from one rail segment to one of the other rail segments.

Furthermore known from document DE 20 2013 011 145 U1, filed by the applicant, is a driverless transport vehicle for the secure transport of heavy loads, based on the aim of providing an autonomous transport vehicle with which fast and especially secure transport of loading racks with loads of up to more than 1000 kg in weight can also be effected in large workshops without problem even in the case of slight inclines. In this document, claim 1 claims a driverless transport vehicle for the secure transport of heavy loads in the form of loaded carriages which are movable on castors, having the following features:

a) a vehicle housing (40) having a central lifting mandrel (15), a left lifting mandrel (28) and a right lifting mandrel (20) for receiving and transporting a carriage (1) using a docking crossbeam (5) integrated in the carriage (1), having two drive wheels (7) which are driven by in each case one drive (16) separately on both sides in the center of the vehicle housing (40) on in each case one separately mounted rotary shaft, wherein a rotation measurement sensor (33) is provided on each drive wheel (7), and wherein support wheels (19) are provided in each case in pairs on the front side and on the rear side of the vehicle housing (40), and wherein at least one laser scanner (2) is mounted in the outer region of the vehicle housing (40), b) a drive motor for driving a lifting spindle (23), which pushes the central lifting mandrel (24) into a central opening in the docking crossbeam using a compression spring (34) and pushes the left lifting mandrel (28) and the right lifting mandrel (20) into corresponding further openings in the docking crossbeam (5) using a pressure plate (27), wherein a system for supplying energy to the transport vehicle by way of inductive lines, laid in the ground, using an induction current collector (39) is provided, c) an emergency stop system having emergency off-switches (9) on the transport vehicle and emergency off-switches (8) on the carriage, wherein the lock of a pressure-loaded brake shoe (45) is released at the same time upon actuation of the emergency off-switches at each castor (3) of the carriage (1).

The present invention is based on the object of specifying an apparatus and a method which provide the possibility of maintaining the precision of the navigation capability of a driverless transport vehicle, or of a transport system, in particular the ability of one or more laser scanners to function, over the entire running time of the vehicle.

This object is achieved by the features in patent claim 1, an apparatus for maintaining the precision of the navigation capability of a driverless transport vehicle (TFS), having the following features:

a) a test station (26) for the temporary stay of a transport vehicle (1) has an open front side and a delimited rear side, wherein in each case two depressions (10) for receiving the drive wheels (11) and two depressions (25) for receiving the support wheels (24) are provided in a surface region (9) on the bottom, b) a test line (18) is provided in the horizontal direction on the rear side of the test station (26) at the height of the laser scanner (2) of a transport vehicle (1), wherein in each case the marking of a test point (13) for the angle adjustment of a laser scanner (2) of a transport vehicle (1) is provided at the same height in the width of the surface region (9) on the left-hand and the right-hand side of the surface region (9), c) a device (19) for moving a cleaning apparatus of the front side of a transport vehicle (1), in particular of the laser scanner (2), is provided on the rear side of the test station (26), and additionally claimed is that a position sensor (20) for the computational capturing of the position of the transport vehicle (1) is provided on the longitudinal sides of the inner region of the test station (26) in the region of the front side and of the rear side of the transport vehicle (1) in each case on both sides, and that a delimitation device (23), consisting of transparent, flexible material or of rods marking the corners of the goods carrier, serves for marking the end of the goods carrier (3), and that the cleaning apparatus consists of a spray nozzle (16) for the cleaning liquid, a brush (15) and a blasting nozzle, that the surface region (9) in the test station (26) has a charging device for electrical energy for charging the electric storage devices of the transport vehicle (1), and the method according to patent claim 6, a method for maintaining the precision of the navigation capability of a driverless transport vehicle (TFS), having the following method features:

a) a driverless transport vehicle (1) is sent autonomously into a test station (26) for checking and cleaning the laser scanner thereof and for checking the electric battery, wherein the control of an FTS and the coordination of the respective work processes are effected by way of a central computer via a central control unit controlled using WLAN, b) the transport vehicle (1) is moved within the test station (26) by way of its drive, and the position thereof is checked, c) if the positioning is correct, the laser scanner (2) of the transport vehicle (1) is cleaned, d) the result of the cleaning process is checked, e) the transport vehicle (1) drives out of the test station (26).

Also claimed is that the transport vehicle (1) is charged with electrical energy during the stay in the test station (26), and a computer program having a program code for performing the method steps when the program is executed in a computer, and a machine-readable carrier with the program code of a computer program for performing the method when the program is executed in a computer.

The invention will be explained in more detail below. Specifically.

Figure 1:
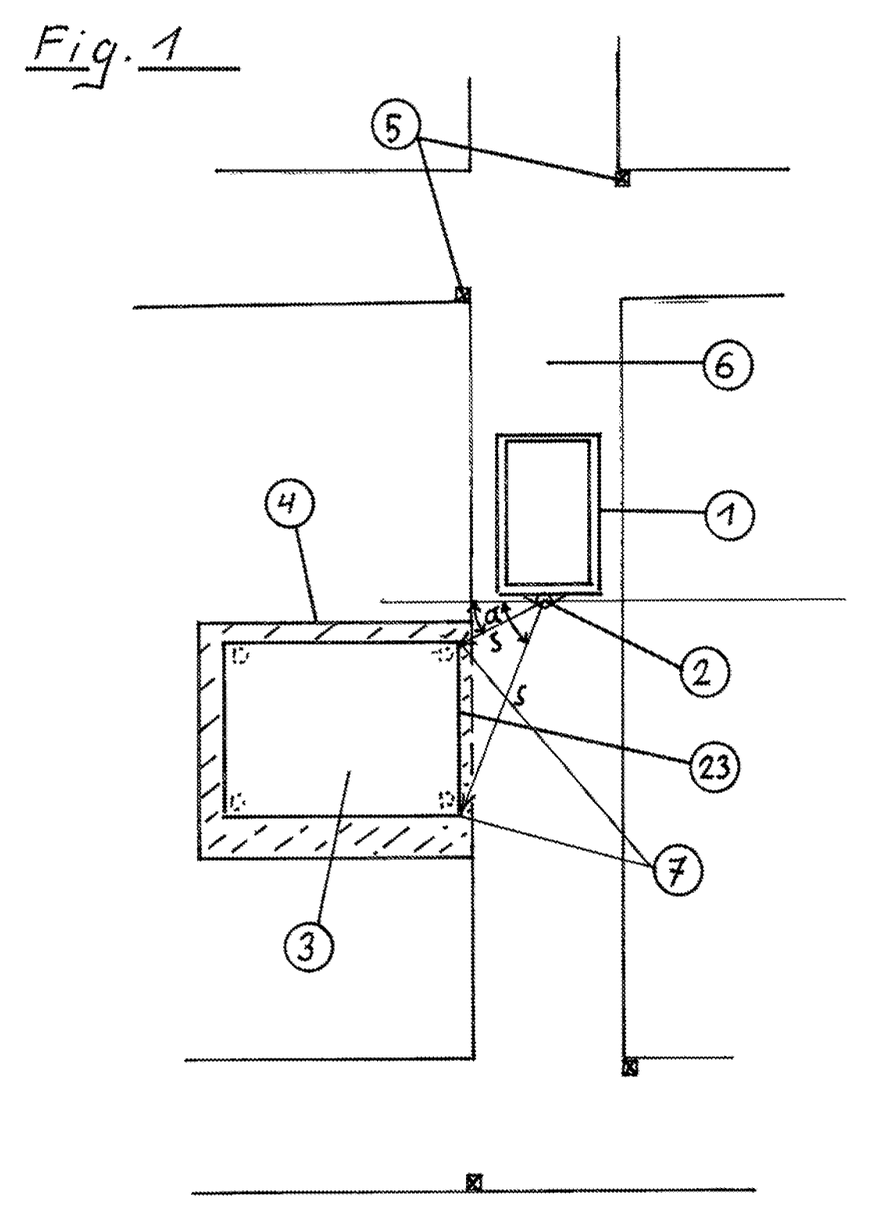
FIG. 1: shows an overview of the travel path of a transport vehicle

FIG. 1 shows an overview of the travel path of a transport vehicle 1. Shown at the center of FIG. 1, seen from above, is a driverless transport vehicle 1 on a street in the form of a junction and two turnoffs. Such a transport vehicle is also referred to as a driverless transport vehicle (FTF). Designated on the front side of the vehicle 1 in the driving direction is a laser scanner 2. A placement region 4, in which a goods carrier 3, for example a pallet that is to be picked up, having two reference points 7 can be seen, is illustrated on the left-hand side of the street 6, shown in the form of a cutout. The reference points shown on the left-hand and the right-hand corner on the front side of the goods carrier 3 can be used by the laser scanner of the vehicle 1 for identifying the goods carrier itself and also for locating the exact place for the pickup thereof by way of the vehicle 1. For this reason, a driving ray s, traveling to the lower reference point 7, and a further driving ray (without designation), traveling to the upper reference point, are drawn in FIG. 1 starting from the center point of the laser scanner 2 for illustrative purposes. Furthermore, an angle alpha between the driving ray s and the horizontal plane, which is necessary for calculating the distance of the laser scanner 2 from the respective reference point 7, is drawn in the case of the upper driving ray in relation to a horizontal reference line. A delimitation device 23 forms the termination with respect to the street 6.

Figure 2:
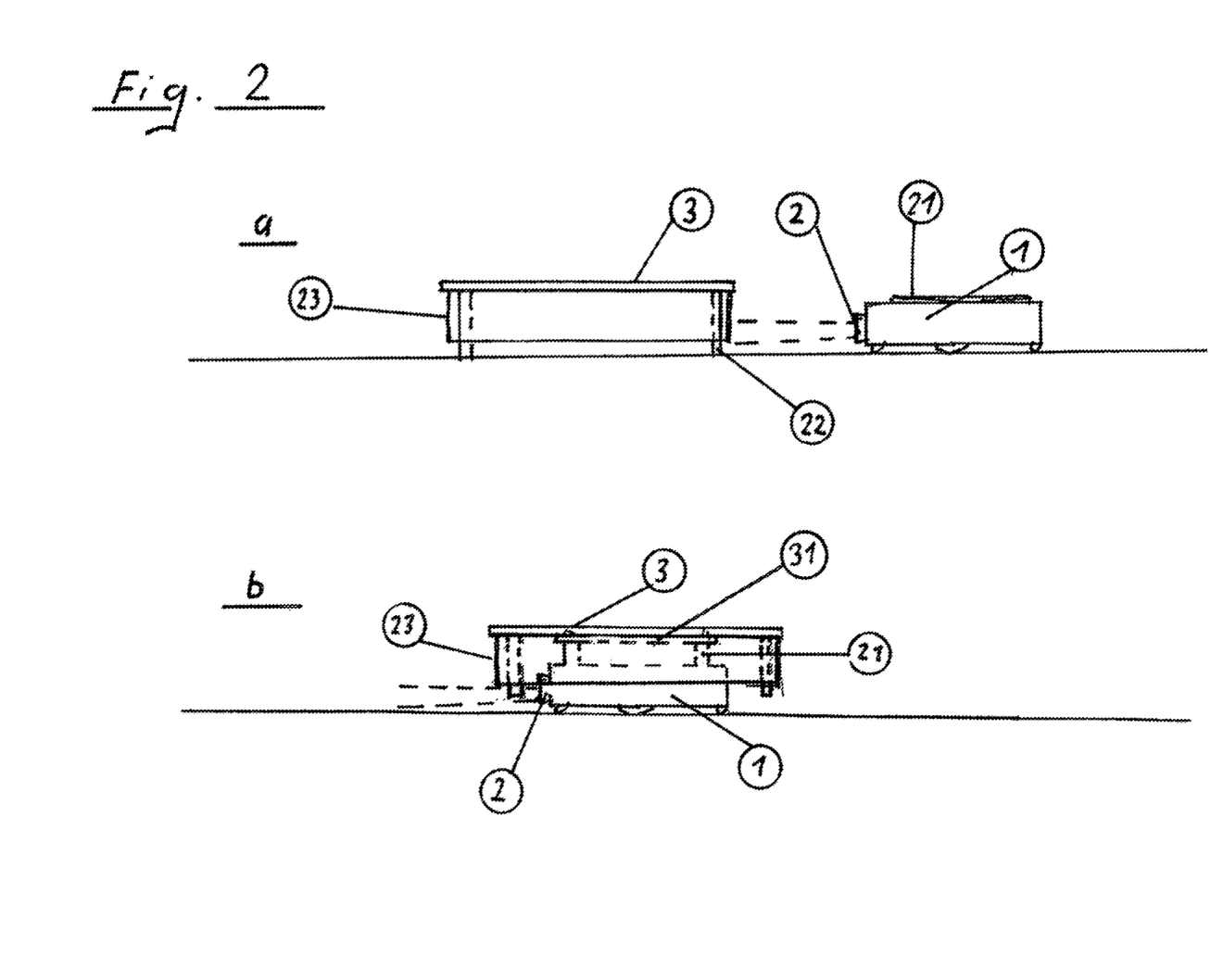
FIG. 2: shows a side view of a process of loading a transport vehicle

FIG. 2 shows a side view of a process for loading a transport vehicle.

FIG. 2a shows a goods carrier 3 having two standing feet 22, which can be seen in this view, and with a delimitation device 23 on the rear side from the side. The delimitation device 23 serves for marking the end of the goods carrier 3. On the opposite side, which carries the delimitation device 23, of the goods carrier 3, a transport vehicle 1 is shown in side view before it moves in under the goods carrier 3, in which the laser scanner 2 scans the dimensions of the goods carrier 3.

The delimitation device 23 can consist for example of a transparent flexible material or of rods that mark the corners of the goods carrier 3. The lifting apparatus 21 for lifting the goods carrier 3 can be seen on the upper side of the transport vehicle 1.

FIG. 2b shows a transport vehicle 1 with its lifting apparatus 21 and a goods carrier 3 placed thereon as a navigation aid in the side view. After the goods carrier 3 is lifted, the measurement field of the laser scanner 2 under the delimitation device 23 becomes exposed for the path orientation.

The rearward delimitation device 23 in the case of each goods carrier 3 is also present in the same form on the left-hand and the right-hand side. This is not drawn in FIG. 2b. The lateral delimitation devices 23 make a precise orientation possible for the laser scanner 2 of a transport vehicle during the drive-in under a goods carrier 3 because said lateral delimitation devices 23 reflect the lateral delimitation lines of the goods carrier 3 exactly in signal-technological terms and, as a result, the goods carrier 3 can be captured exactly.

Figure 3:
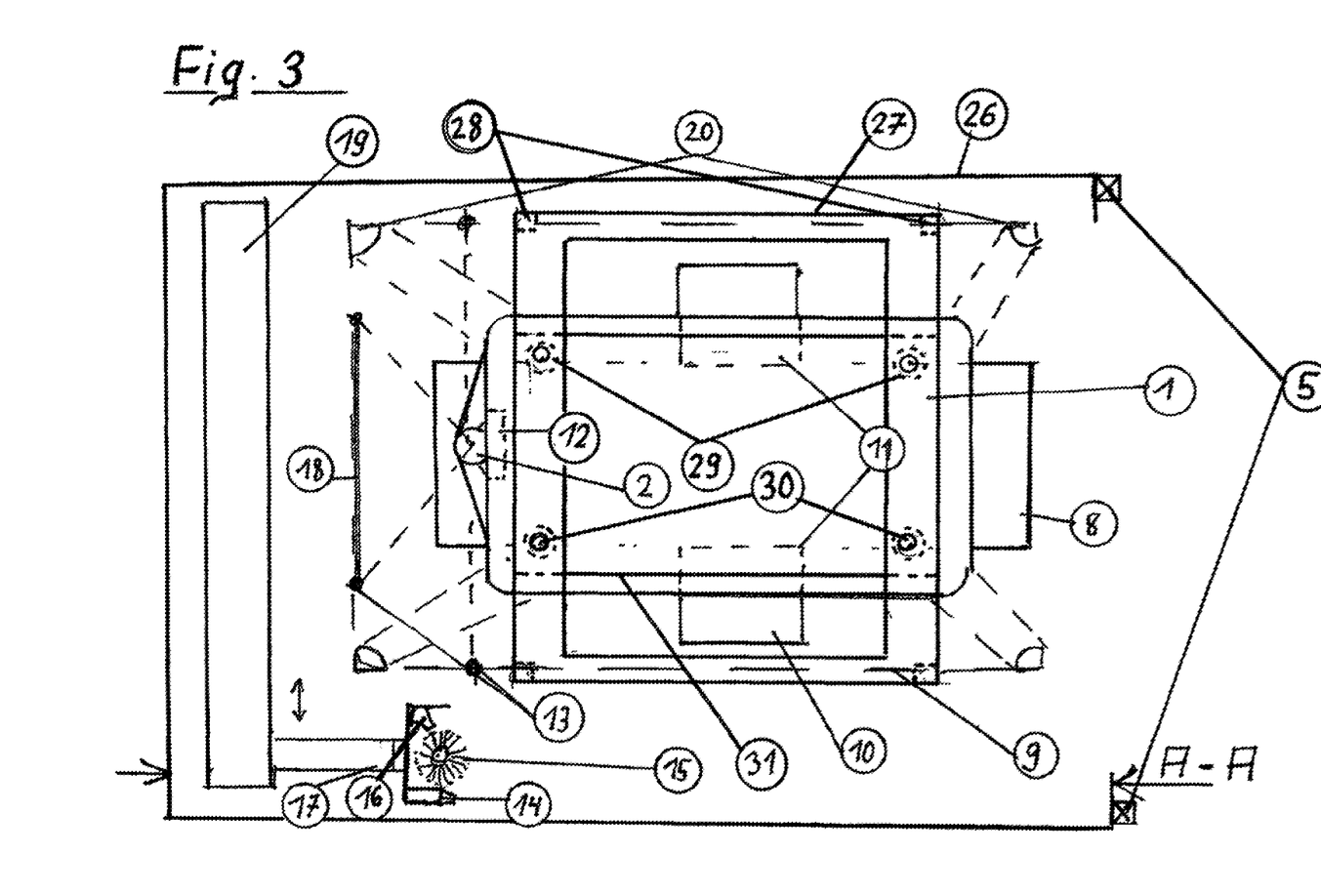
FIG. 3: shows a plan view of a transport vehicle during the alignment of the laser scanner in a test station 26

FIG. 3 shows a plan view of a transport vehicle 1 during the alignment of the laser scanner in a test station 26. In each case a reference mark 5 for the orientation for a transport vehicle 1 is attached on the front side of the test station 26 on the left-hand and the right-hand side. The section indication A-A shown on this side is an indication relating to the view in FIG. 4.

A main drive wheel 11 can be seen from above in each case in a respective depression 10 for fixing the relevant main drive wheel 11 on both longitudinal sides on the transport vehicle 1 that is shown at the center of FIG. 3 and is located in a surface region 9 in the test station 26.

Located thereabove is the alignment and fixing device 27, which serves for aligning the lifting stage 31 and the lifting device 21. The fixing cones 29 of the lifting stage 21, which protrude into the reference openings 30 of the alignment device 27, serve for exact alignment. It is possible using the alignment device 27 and the lifting device 21 to align and fix the transport vehicle 1 with accurate positioning in the test station 26.

In this position of the transport vehicle 1, a charging mat 8 for charging the transport vehicle with electrical energy is attached over the entire length of the transport vehicle to the base area of the underbody, wherein FIG. 3 shows on the front side and the rear side of the transport vehicle in each case one partial piece of the charging mat 8 protruding.

On the front side of the transport vehicle 1, the laser scanner 2 and an associated device 12 for aligning the laser scanner 2 can be seen from above. Opposite the device for aligning the laser scanner 2, a test line 18 is provided at the corresponding working height of the laser scanner 2 on a perpendicular delimitation surface in the test station 26, wherein in each case one test point 13 for the angle adjustment of the laser scanner 2 is provided at the same height of the test line 18 and at the same time at the working height of the laser scanner in the lateral direction. The test line 18 also serves the laser scanner 2 for measuring the distance. For the evaluation, the distance data are compared to specific parameters and likewise needed for checking and aligning the laser scanner 2. Since it is necessary for the alignment of the laser scanner 2 that the transport vehicle is located exactly at the place that is specified herefor, a precision sensor 20 for location determination is provided in each case on both sides of the transport vehicle 1 at a specific distance from the vehicle in the upper region of FIG. 3. In addition, two further precision sensors 20 for the location determination on the opposite side are provided on the opposite side of the transport vehicle. The signals of the sensors 20 are captured by computer and control the use of the measurement procedure of the laser scanner 2. In the case of a necessary location change of the transport vehicle in the longitudinal direction, corresponding control signals are sent to the main drive wheels 11. Necessary corrections of the transport vehicle 1 in the transverse direction can be captured by computer and be easily performed in a data-technological fashion. In a dedicated configuration level, provision may be made for further sensors to be also located at the front side and the rear side of the transport vehicle and for all the sensors to mutually monitor one another in terms of their position.

For cleaning the laser scanner 2, a spray nozzle for cleaning liquid 16 is provided on a carrier 17 at the rear wall of the test station 26, wherein a brush 15 can be guided with a spray nozzle 16 along the front side of the transport vehicle. A blasting nozzle 14 serves, in conjunction with the spray nozzle 16 and the brush 15, for drying the cleaned surfaces or the cleaned vehicle components. The cleaning tools shown are examples and can be modified in view of the temperatures prevailing in the operating space and/or of the atmospheric conditions.

In a specific structural embodiment, the result of the cleaning process is checked by way of the radiant power of the cleaned laser scanner 2 to be measured using a measurement apparatus which can be connected upstream (not illustrated). The intervals of cleaning of the laser scanner 2 of a transport vehicle and the respective results of the cleaning process are captured by data-technological means and are evaluated with respect to the lifetime of all installation parts.

Figure 4:
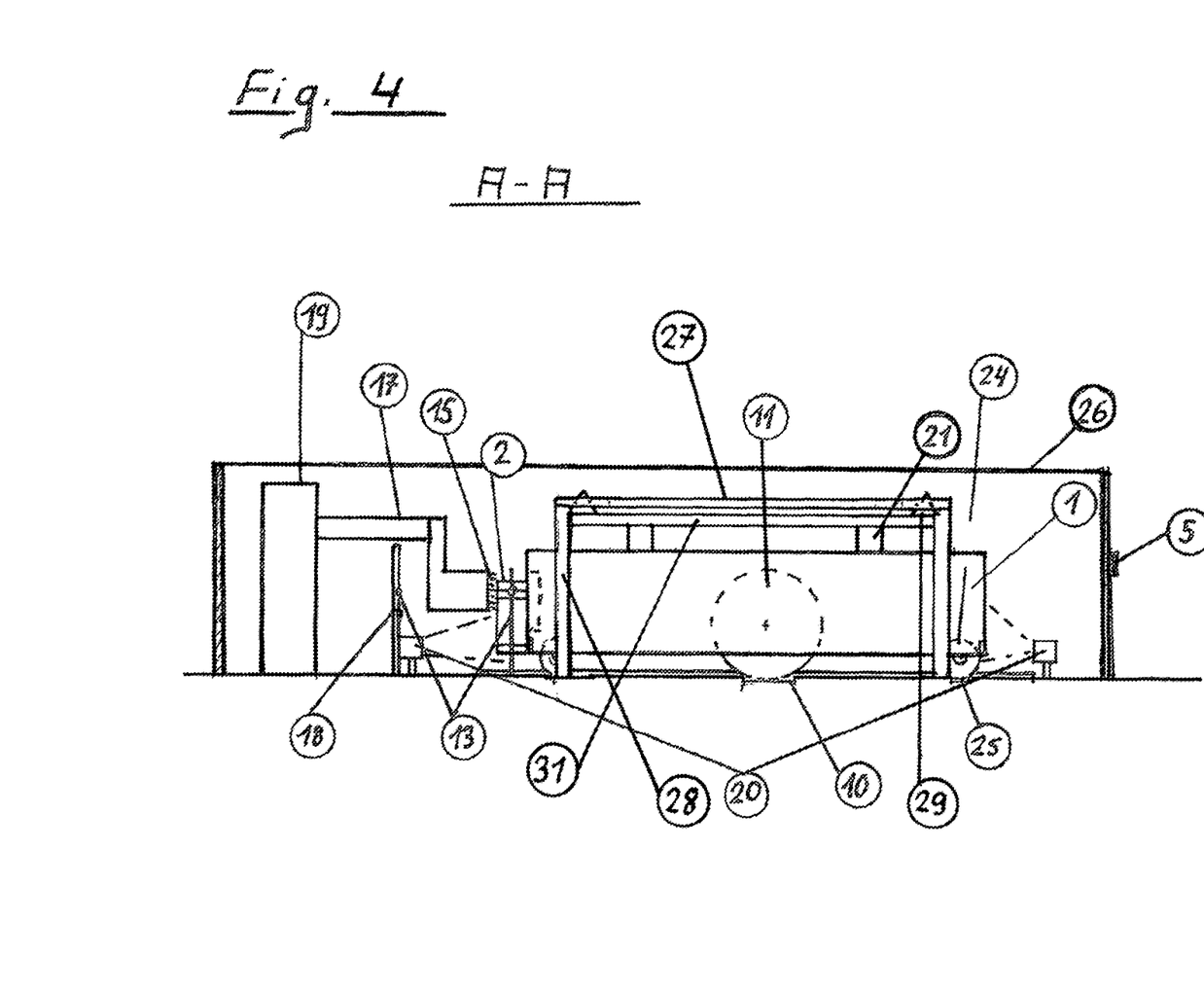
FIG. 4: shows a side view of the test station 26

FIG. 4 shows a side view 26 of the test station 26 according to the section A-A in FIG. 3. A reference mark 6 is shown on the front side for the orientation for a transport vehicle 1. The main drive wheels 11 in this FIG. 4 are shown in the depression 10 of the transport vehicle 1 and its lifting apparatus 21 in connection with the support wheels 24 in the side view, wherein the support wheels 24 are also held in a specific respective bottom depression 25. The figure here shows the extended lift device 21, which fixes the transport vehicle 1 from the upper side with exact positioning using the fixing cones 29 in the reference openings 30 of the alignment apparatus 27. The position sensors 20 described in FIG. 3 can be seen here held with corresponding support elements on the bottom surface. Also shown in this view in the region of the height line 18 is the holding of the test points 13 for the angle adjustment. The laser scanner 2 and the device 12 for aligning the laser scanner are here likewise shown. The brush 15 on its angled carrier 17 for the cleaning head is moved transversely to the drawing plane by way of the device 19.

Figure 5:
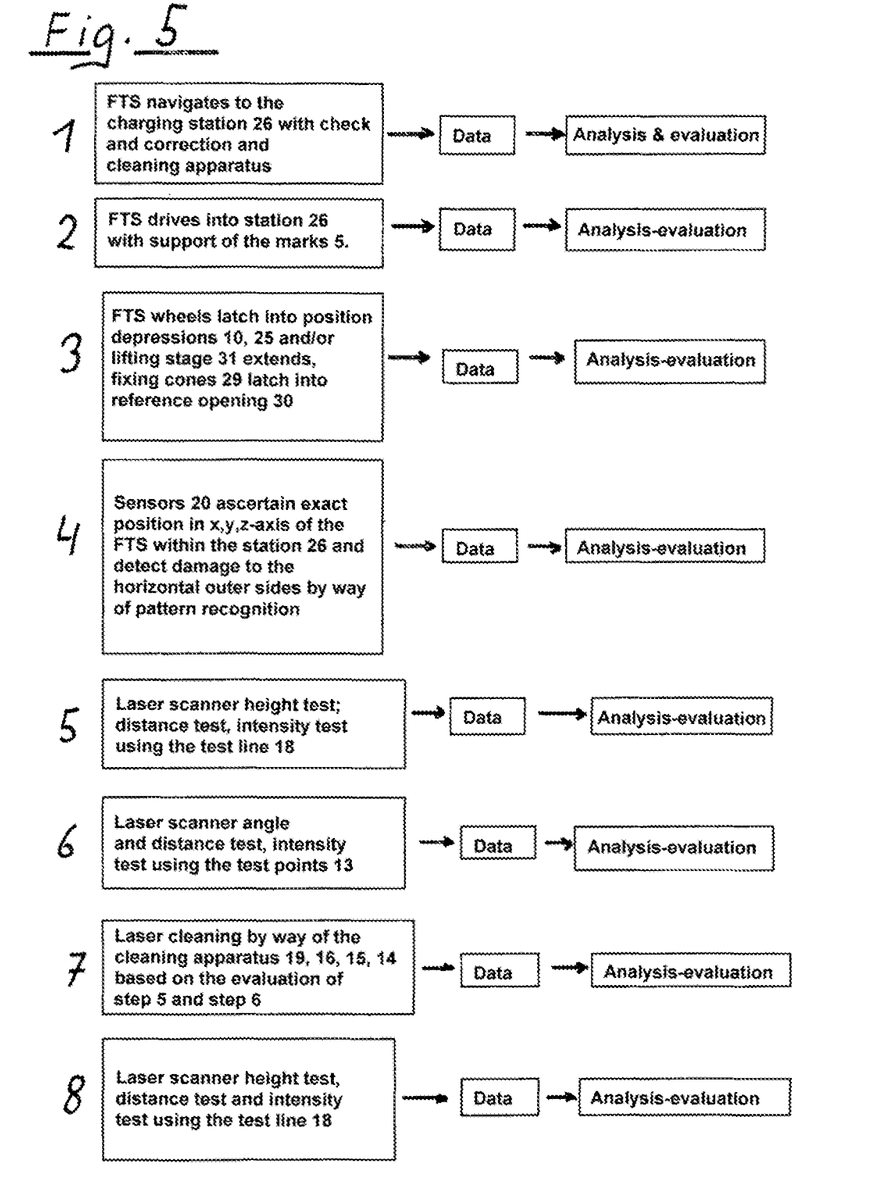
FIG. 5: shows an overview of the processes in the test station 26

FIG. 5 shows an overview of the processes in the test station 26.

Here, the driverless transport vehicle is referred to as FTF for the sake of simplicity.

Control and coordination of the movements of the FTF used in the respective installation is effected using a WLAN signal that is operated via a central computer and a central control unit.

Eight of a total of 18 steps are shown here, of which in each case data are ascertained that result in the ascertainment of current operating data required for the analysis of the total operating data and for controlling the installation.

The 1st step relates to the navigation of an FTF to the test station and charging station 26, in which a test unit and a cleaning apparatus for the laser scanner 2 are located.

The 2nd step relates to the drive into the test station 26. An FTF here drives into the charging station 26, controlled via WLAN, with the aid of the navigation of a laser scanner 2 and two reference marks 5.

The 3rd step relates to fixing the wheels of an FTF. The FTF drives up to the position depressions (10, 25) until the wheels latch into the depressions. The lifting stage 31 extends upward and the fixing cones 29 latch into the reference openings 30 of the alignment apparatus 27.

The 4th step relates to the exact position within the test station 26 and ascertains damage to the FTF. The sensors 20 ascertain the exact position of the FTS within the charging station 26 in the direction of the X,Y,Z-axes and at the same time, damage to the horizontal outer skin of the FTF can be detected by way of pattern recognition.

The 5th step relates to a height test and intensity test of the laser scanner. A height test and a distance test of the laser scanner 2 and a laser beam intensity test are performed using the test line 18. The data are transmitted to the central computer for evaluation.

The 6th step relates to a laser scanner angle test, distance test and an intensity test using the test points 13. An angle range measurement (lateral measurement region) of the laser scanner 2 and a distance test are performed with the aid of the measurement points 13 and an intensity test is performed. The data are transmitted to the central computer for evaluation.

The 7th step relates to a laser cleaning by way of the cleaning apparatus (19, 16, 15, 14) based on the evaluation of step 5 and step 6. The cleaning process by the cleaning apparatus is initiated owing to the analysis and the evaluation of step 5 and step 6.

The 8th step relates to a height test, distance test and intensity test of the laser scanner. A height test of the laser scanner 2 and a laser beam intensity test are performed using the test line 18. The data is transmitted to the central computer for evaluation.

Repetition of step 5 to check the result of the cleaning. The data are transmitted to the central computer for evaluation.

Figure 5A:
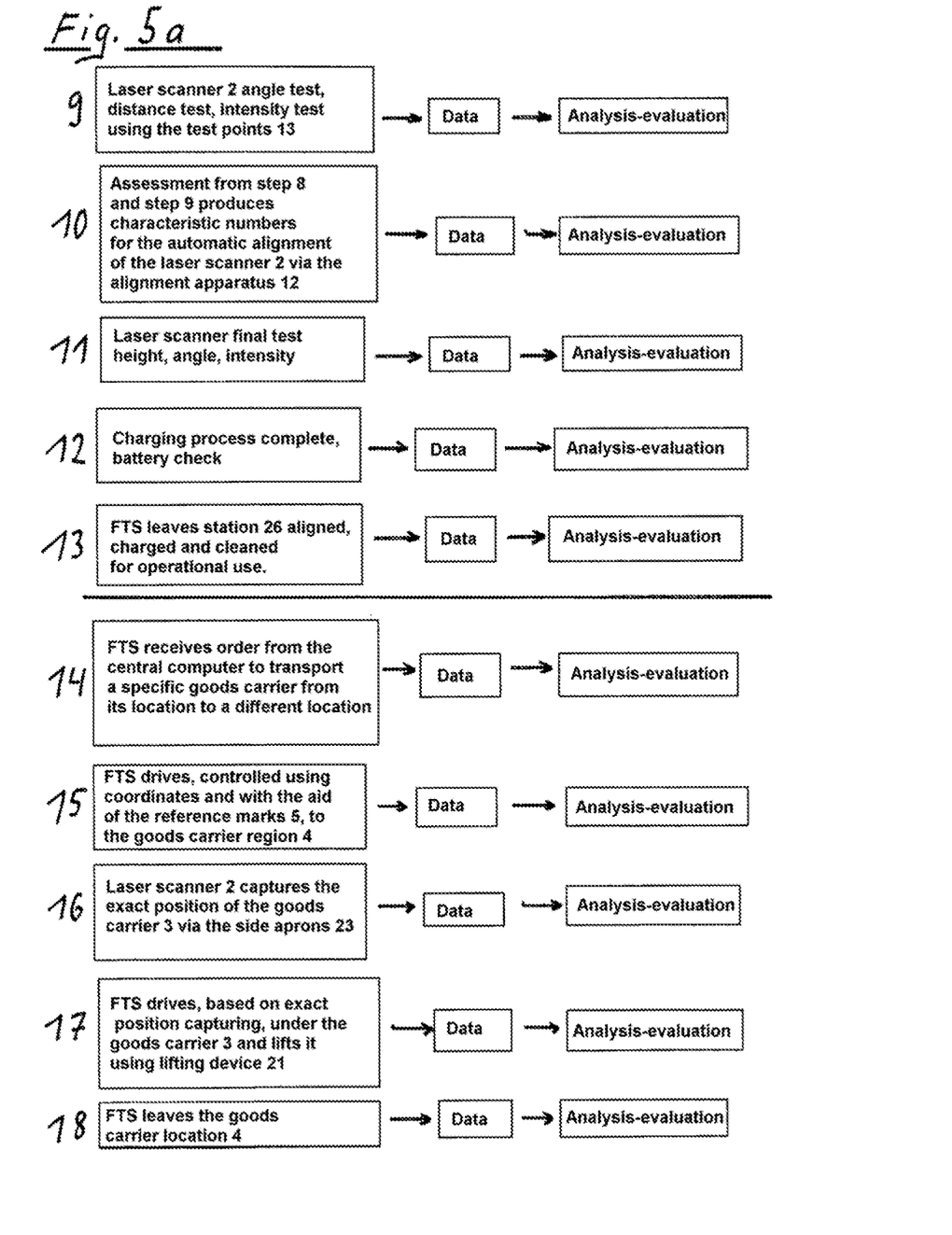
FIG. 5a: shows the continuation of the overview of FIG. 5

FIG. 5a shows the continuation of the overview of FIG. 5.

The 9th step relates to a laser scanner angle test and an intensity test using the test points 13. An angle range measurement of the laser scanner 2 and a distance test are performed with the aid of the measurement points 13 and an intensity test is performed. Step 6 is repeated to check the result of the cleaning.

The 10th step relates to an assessment from step 8 and step 9. Characteristic numbers for the automatic alignment of the laser scanner 2 via the alignment apparatus 12 are produced. The alignment can also, depending on a deviation, only be performed by data-technological means. Owing to the evaluation of step 8 and step 9, step 7, relating to the cleaning, can be repeated, or the realignment of the laser scanner 12 is performed owing to the output of characteristic numbers to the alignment apparatus 12.

The 11th step relates to a laser scanning final test with respect to the height, the angle, the distance, and the intensity.

The laser scanner undergoes a final test which is to have a result within a tolerance range. If this is not the case, step 7 and step 10 are repeated.

The 12th step relates to the process of the electrical charging of the FTS.

The FTF is checked for its state of charge and, if necessary, the electric battery is charged.

The 13th step relates to driving the FTF out of the station 26. The FTF leaves the station 26 in a technically correct condition (aligned, cleaned, and charged) for further operational use.

The 14th step relates to the further use of the FTF. The FTF receives an order from the central computer and the control unit to transport a specific goods carrier from its current location to a different location.

The 15th step relates to the drive of the FTF to the placement region 4.

The FTF drives, controlled using coordinates and with the aid of the reference marks 5, along the street 6 to the placement region 4, where the goods carriers are held.

The 16th step relates to capturing the specific goods carrier 3.

Upon arrival at the placement region 4, the laser scanner 2 captures the exact position of the goods carrier 3 via the rubber aprons 23.

The 17th step relates to the pick-up of the goods carrier 3 using the lifting device 21. The FTF drives, on account of the exact position determination and capturing, under the goods carrier 3 through the delimitation device 23 and lifts it.

The 18th step relates to the continued drive of the FTF. The FTF leaves the placement place and drives to the storage place (location) determined via the central computer.

LIST OF REFERENCE NUMBERS 1 driverless transport vehicle or transport system (FTF)
2 laser scanner
3 goods carrier (for example a pallet)
4 placement region
5 reference mark
6 street
7 reference point on goods carrier
8 charging mat (charging device for electrical energy)
9 surface region for the charging mat, the check, the alignment and the cleaning of a driverless transport vehicle
10 depression in the base area for fixing the drive wheels (FTF)
11 main drive wheels of a driverless transport vehicle
12 device for alignment of a laser scanner
13 test points for the angle adjustment of a laser scanner
14 blasting nozzle for drying of a cleaning apparatus
15 brush for cleaning in the cleaning apparatus
16 spray nozzle for cleaning liquid
17 carrier for the cleaning head
18 test line for height setting of a laser scanner
19 device for moving the cleaning apparatus
20 position sensors for location determination of a driverless transport vehicle
21 lifting apparatus for a goods carrier
22 standing foot for goods carrier
23 delimitation device
24 support wheel
25 bottom depression for a support wheel
26 test station and charging station
27 fixing and alignment apparatus for lifting device 21
28 supports for alignment apparatus 27
29 fixing cones for lifting stage 31 for goods carrier 3
30 reference openings for fixing cones 29
31 lifting stage

The invention claimed is:

1. An apparatus for maintaining a precision of a navigation capability of a driverless transport vehicle (TFS), having the following features:
a test station (26) for a temporary stay of a transport vehicle (1) that has an open front side and a delimited rear side, wherein in each case two depressions (10) for receiving drive wheels (11) and two depressions (25) for receiving support wheels (24) are provided in a surface region (9) on a bottom;
a test line (18) is provided in a horizontal direction on the rear side of the test station (26) at a height of a laser scanner (2) of the transport vehicle (1), wherein in each case a marking of a test point (13) for an angle adjustment of the laser scanner (2) of the transport vehicle (1) is provided at a same height in a width of the surface region (9) on a left-hand and a right-hand side of the surface region (9);
a device (19) for moving a cleaning apparatus on the front side of the transport vehicle (1) is provided on the rear side of the test station (26); and
a position sensor (20) for computational capturing of a position of the transport vehicle (1) is provided on longitudinal sides of an inner region of the test station (26) in a region of the front side and of the rear side of the transport vehicle (1).

2. The apparatus of claim 1 comprising a delimitation device (23), consisting of transparent, flexible material or of rods marking corners of a goods carrier, serves for marking an end of the goods carrier (3).

3. The apparatus of claim 1, wherein the cleaning apparatus consists of a spray nozzle (16) for a cleaning liquid, a brush (15), and a blasting nozzle (14) for drying.

4. The apparatus of claim 1, wherein the surface region (9) in the test station (26) has a charging device for electrical energy for charging electric storage devices of the transport vehicle (1).

5. An apparatus for maintaining a precision of a navigation capability of a driverless transport vehicle (TFS), having the following features:
a test station (26) for a temporary stay of a transport vehicle (1) that has an open front side and a delimited rear side, wherein in each case two depressions (10) for receiving drive wheels (11) and two depressions (25) for receiving support wheels (24) are provided in a surface region (9) on a bottom;
a test line (18) is provided in a horizontal direction on the rear side of the test station (26) at a height of a laser scanner (2) of the transport vehicle (1), wherein in each case a marking of a test point (13) for an angle adjustment of the laser scanner (2) of the transport vehicle (1) is provided at a same height in a width of the surface region (9) on a left-hand and a right-hand side of the surface region (9);
a device (19) for moving a cleaning apparatus on the front side of the transport vehicle (1) is provided on the rear side of the test station (26); and
a delimitation device (23), consisting of transparent, flexible material or of rods marking corners of a goods carrier, serves for marking an end of the goods carrier (3).

6. The apparatus of claim 5 comprising a position sensor (20) for computational capturing of a position of the transport vehicle (1) is provided on longitudinal sides of an inner region of the test station (26) in a region of the front side and of the rear side of the transport vehicle (1).

7. The apparatus of claim 5, wherein the cleaning apparatus consists of a spray nozzle (16) for a cleaning liquid, a brush (15), and a blasting nozzle (14) for drying.

8. The apparatus of claim 5, wherein the surface region (9) in the test station (26) has a charging device for electrical energy for charging electric storage devices of the transport vehicle (1).

9. An apparatus for maintaining a precision of a navigation capability of a driverless transport vehicle (TFS), having the following features:
- a test station (26) for a temporary stay of a transport vehicle (1) that has an open front side and a delimited rear side, wherein in each case two depressions (10) for receiving drive wheels (11) and two depressions (25) for receiving support wheels (24) are provided in a surface region (9) on a bottom;
- a test line (18) is provided in a horizontal direction on the rear side of the test station (26) at a height of a laser scanner (2) of the transport vehicle (1), wherein in each case a marking of a test point (13) for an angle adjustment of the laser scanner (2) of the transport vehicle (1) is provided at a same height in a width of the surface region (9) on a left-hand and a right-hand side of the surface region (9); and
- a device (19) for moving a cleaning apparatus on the front side of the transport vehicle (1) is provided on the rear side of the test station (26), wherein the cleaning apparatus consists of a spray nozzle (16) for a cleaning liquid, a brush (15), and a blasting nozzle (14) for drying.

10. The apparatus of claim 9 comprising a position sensor (20) for computational capturing of a position of the transport vehicle (1) is provided on longitudinal sides of an inner region of the test station (26) in a region of the front side and of the rear side of the transport vehicle (1).

11. The apparatus of claim 9 comprising a delimitation device (23) consisting of transparent, flexible material or of rods marking corners of a goods carrier, serves for marking an end of the goods carrier (3).

12. The apparatus of claim 9, wherein the surface region (9) in the test station (26) has a charging device for electrical energy for charging electric storage devices of the transport vehicle (1).

* * * * *